US006267546B1

(12) United States Patent
Oxyer et al.

(10) Patent No.: US 6,267,546 B1
(45) Date of Patent: Jul. 31, 2001

(54) SECONDARY LATCH FOR A TIRE CARRIER

(75) Inventors: Derek Lee Oxyer, Waterford; Ramakrishna Putumbaka, Farmington Hills; Bruce Daniel Kingsbury, Lake Orion, all of MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 09/540,138

(22) Filed: Mar. 31, 2000

Related U.S. Application Data
(60) Provisional application No. 60/127,074, filed on Mar. 31, 1999.

(51) Int. Cl.⁷ ...................................................... B66D 1/54
(52) U.S. Cl. ............................................ 414/463; 254/323
(58) Field of Search ............................ 254/323; 414/463, 414/466

(56) References Cited

U.S. PATENT DOCUMENTS

| 5,188,341 | 2/1993 | Greaves . |
| 6,079,932 | * 6/2000 | Boucher ................................ 414/463 |
| 6,092,790 | * 7/2000 | Dobmeier et al. ............... 414/463 X |

* cited by examiner

Primary Examiner—Janice L. Krizek

(74) Attorney, Agent, or Firm—Porter, Wright, Morris & Arthur, LLP

(57) ABSTRACT

A tire carrier assembly for storing a spare tire of a motor vehicle includes a tire carrier for supporting the spare tire and having a swivel with a shank portion and a head portion along the shank portion, a winch assembly operably connected to the tire carrier with a cable or rope to raise and lower the tire carrier between upper and lower positions, a housing assembly forming a horizontal support surface, and a secondary latch assembly secured to the housing assembly and adapted to selectively confine the tire carrier in the upper position. The secondary latch assembly includes a sliding latch member supported by the horizontal support surface and an actuator adapted to selectively move the latch member along a linear path between a locking position and an unlocking position. The latch member is adapted to permit passage of the of the shank portion but not the head portion past the latch member when the latch member is in the locking position and to permit passage of both the shank portion and the head portion past the latch member when the latch member is in the unlocking position. The actuator includes an arm pivotable between a locking position and an unlocking position and having one end extending through an opening formed in the latch member such that pivotal movement of the arm linearly moves the latch member. The actuator further includes a spring member biasing the arm to the locking position. Various alternative embodiments are also disclosed wherein the actuator arm is connected to the latch member with a pin-and-slot connection and wherein the latch member has resilient fingers.

27 Claims, 9 Drawing Sheets

SECONDARY LATCH FOR A TIRE CARRIER

RELATED APPLICATIONS

This application claims priority benefit of U.S. Provisional patent application No. 60/127,074 filed on Mar. 31, 1999.

FIELD OF THE INVENTION

The present invention generally relates to a tire carrier for a vehicle and, more particularly, to a secondary latch for maintaining the tire carrier in a stowed position.

BACKGROUND OF THE INVENTION

Vehicles with inflatable tires such as passenger cars, light and heavy duty trucks, tractor trailers, buses, commercial delivery vehicles, among other motorized forms of transportation and trailers pulled by such vehicles are conventionally equipped with spare tires. Some spare tires are stored under the vehicle using a tire carrier which includes a tire winch for raising and lowering the spare tire between a raised or stored position and a lowered or accessed position. The winch typically raises and lowers the spare tire using a flexible member such as a cable or cord which is wound and unwound on a spool or reel. A secondary latch is often provided to secure the spare tire in the stored position. If the flexible member or winch fails while the spare tire is in the stored position, the secondary latch ensures that the spare tire remains in the stored position.

For example, U.S. Pat. No. 5,188,341, the disclosure of which is expressly incorporated herein in its entirety, discloses a secondary latch for a tire carrier. The secondary latch includes a latch member which is pivotably mounted to swing a pair of arcuate fingers between a locked position and an unlocked position. The lock member is biased to the locked position by gravity. The lock member is selectively pivoted to the unlocked position by a lever which is activated by a cranking member when engaging the winch.

While these secondary latches may effectively retain the spare tire in the stored position under some conditions, they have numerous shortcomings. For example, loads are transmitted through a relatively small contact area, a relatively large number of parts are required, they are relatively difficult to assemble, and relatively large number of high tolerance components are required. Accordingly, there is a need in the art for a secondary latch which has improved load distribution, reduced weight, ease of assembly, and a reduced number of total parts and high tolerance parts.

SUMMARY OF THE INVENTION

The present invention provides a latch mechanism for a vehicle which overcomes at least some of the above-noted problems of the related art. According to the present invention, a tire carrier assembly comprising, in combination a tire carrier having a shank portion and a head portion along the shank portion, a winch assembly operably connected to the tire carrier to raise and lower the tire carrier between upper and lower positions, a housing assembly, and a latch assembly. The latch assembly is secured to the housing assembly and includes a latch member and an actuator adapted to selectively move the latch member along a linear path between a locking position and an unlocking position. The latch member is adapted to permit passage of the of the shank portion but not the head past the latch member when the latch member is in the locking position and to permit passage of both the shank portion and the head portion past the latch member when the latch member is in the unlocking position.

According to another aspect of the present invention, a tire carrier assembly comprises, in combination, a tire carrier having a shank portion and a head portion along the shank portion, a winch assembly operably connected to the tire carrier to raise and lower the tire carrier between upper and lower positions, a housing assembly forming a support surface, and a latch assembly. The latch assembly includes a latch member supported by the support surface and an actuator adapted to selectively move the latch member between a locking position and an unlocking position. The latch member and the support surface are adapted to permit passage of the of the shank portion but not the head portion past the latch member when the latch member is in the locking position and to permit passage of both the shank portion and the head portion past the latch member when the latch member is in the unlocking position.

From the foregoing disclosure and the following more detailed description of various preferred embodiments it will be apparent to those skilled in the art that the present invention provides a significant advance in the technology and art of latching mechanisms. Particularly significant in this regard is the potential the invention affords for providing a light weight, high quality, feature-rich, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 4 is a plan view of a slider or lock member of the tire carrier of FIGS. 1 to 3;

FIG. 8 is a plan view of a slider or lock member of the tire carrier of FIGS. 6 and 7;

Figure 9:
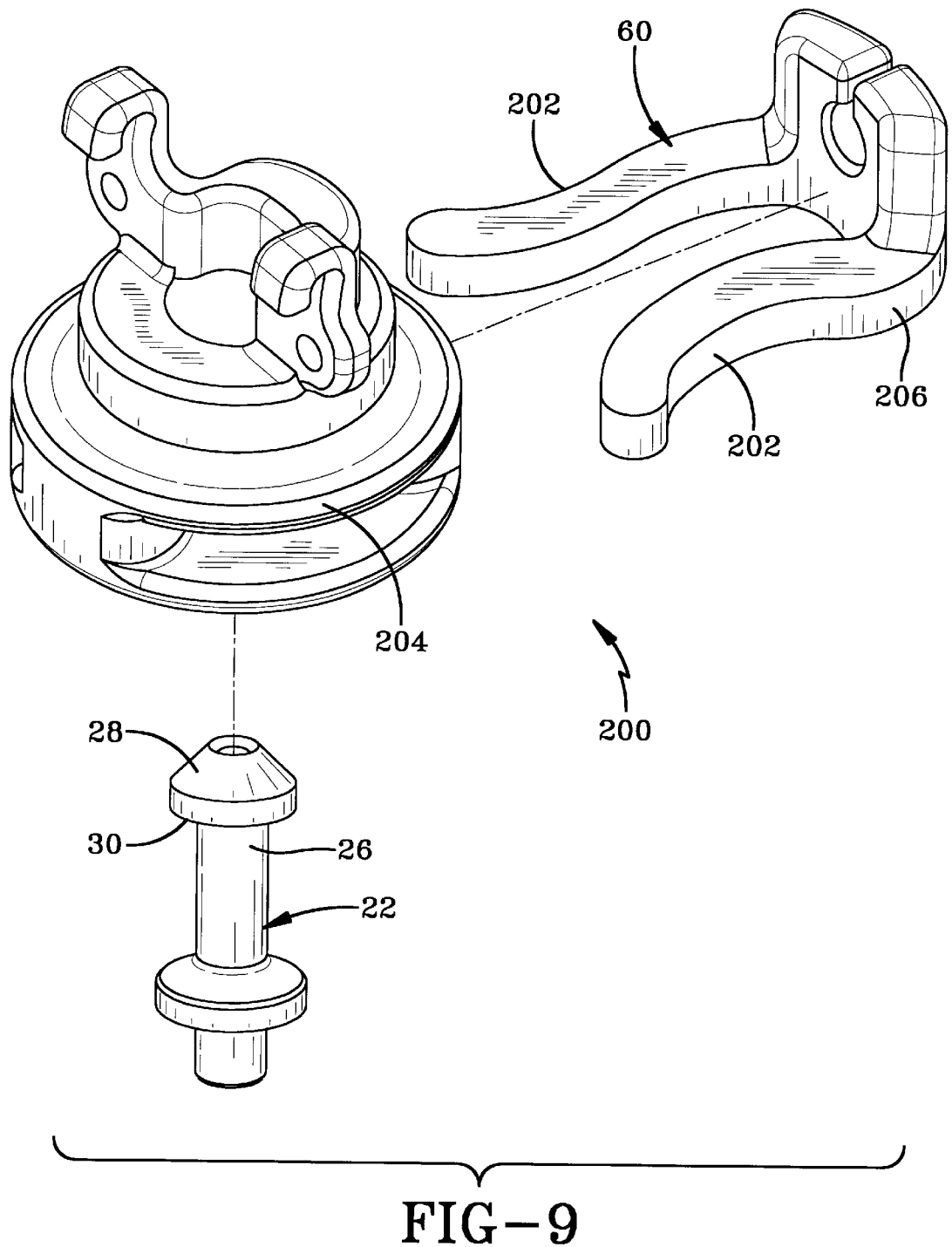
FIG. 9 is a perspective partially exploded view of a secondary latch for a tire carrier according to a third embodiment of the present invention.
Figure 10:
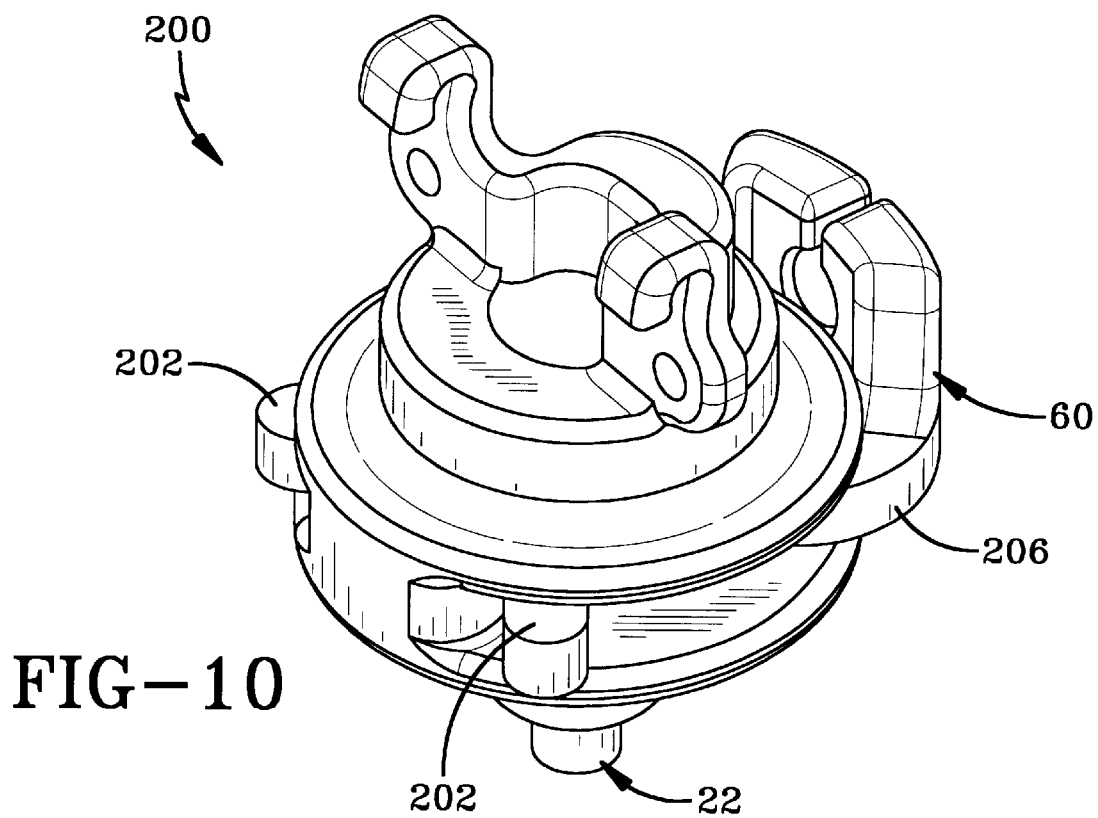
FIG. 10 is a top perspective view of the secondary latch of FIG. 9 wherein the secondary latch is in a locked position.
Figure 11:
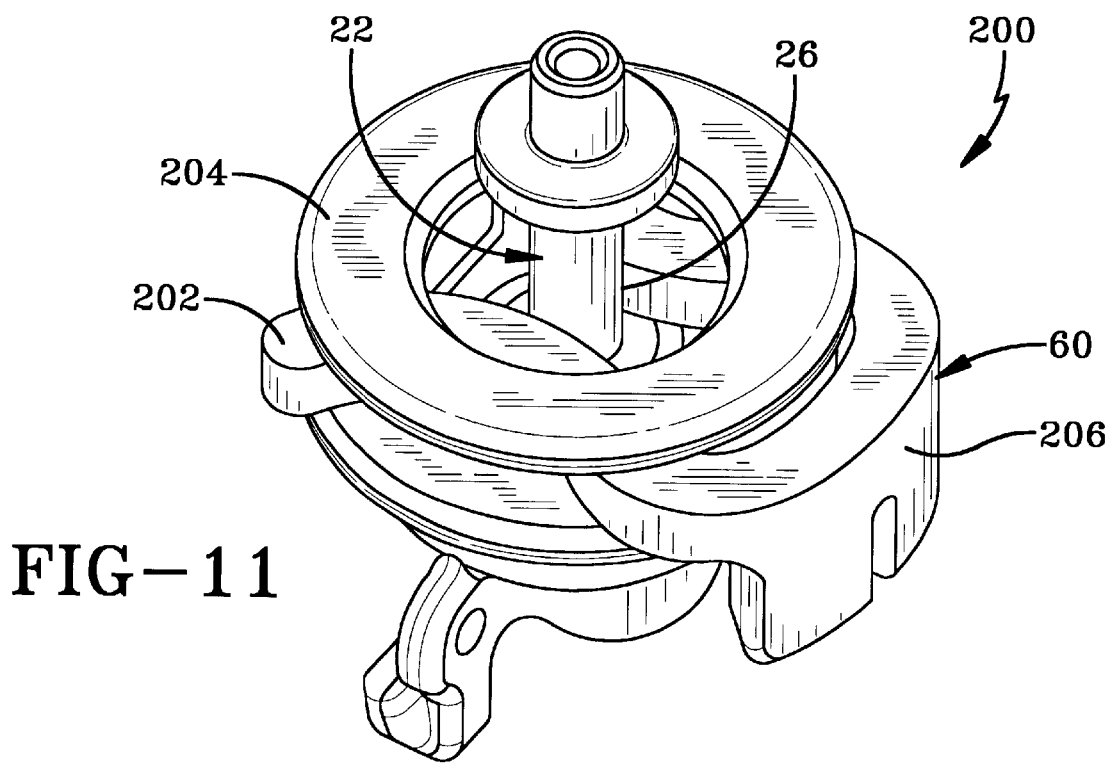
FIG. 11 is bottom perspective view of the secondary latch of FIGS. 9 and 10 wherein the secondary latch is in a locked position.
Figure 12:
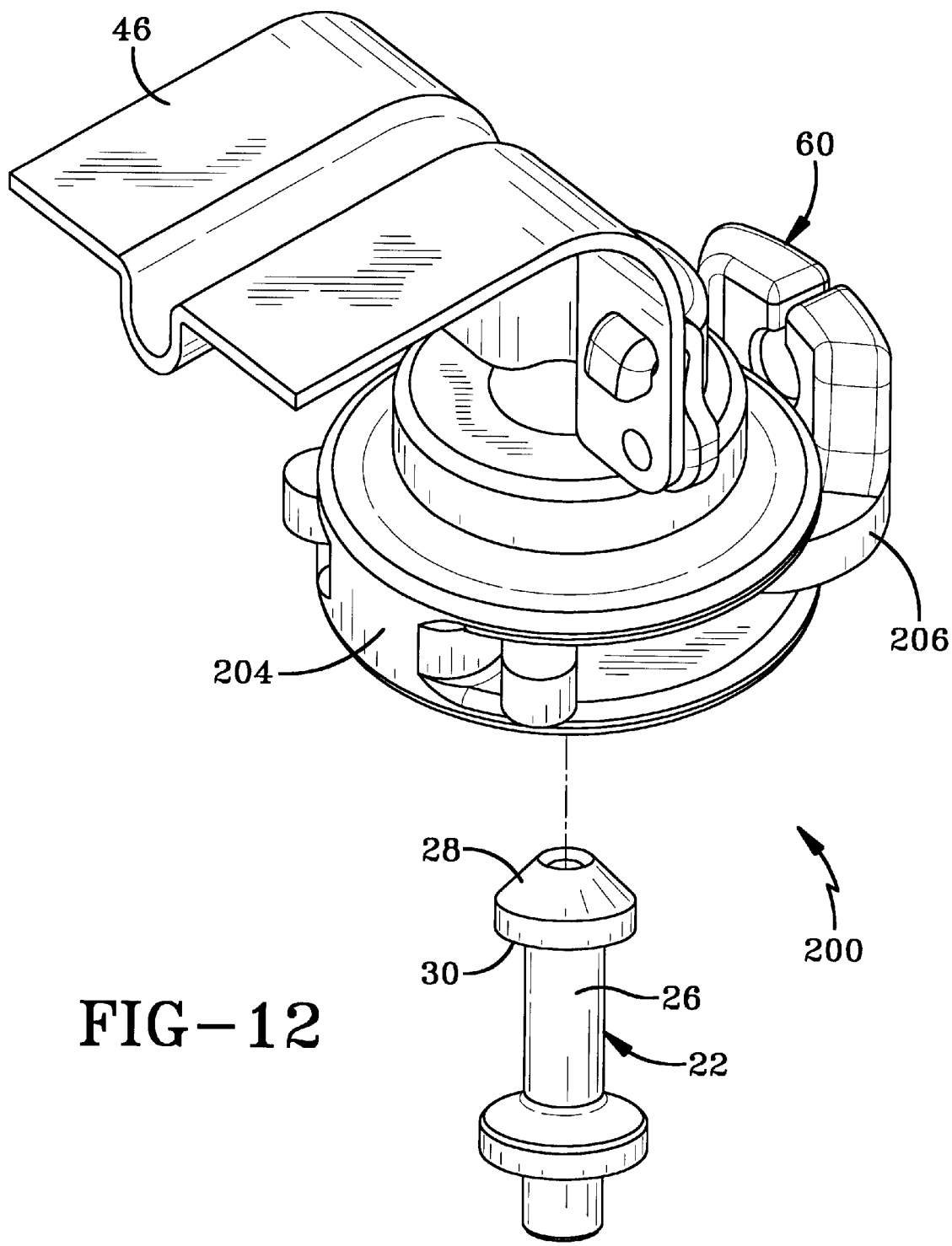
FIG. 12 is a perspective view of the secondary latch of FIGS. 9 to 11, wherein the secondary latch is secured to a mounting bracket.

It should be understood that the appended drawings are not necessarily to scale, presenting a somewhat simplified representation of various preferred features illustrative of the basic principles of the invention. The specific design features of a latching mechanism as disclosed herein, including, for example, specific shapes of the lock member or actuator arm will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tire carrier illustrated in the drawings. In general, up or upward refers to an upward direction in the plane of the paper in FIGS. 1, 6 and 9 and down or downward refers to a downward direction in the plane of the paper in FIGS. 1, 6 and 9.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved secondary latch for a tire carrier disclosed herein. The following detailed discussion of various alternative and preferred embodiments will illustrate the general principles of the invention with reference to a tire carrier for use with a motor vehicle. Other embodiments suitable for other applications will be apparent to those skilled in the art given the benefit of this disclosure.

Referring now to the drawings, FIGS. 1 to 5 illustrate a tire carrier assembly 10 for a spare tire of a motor vehicle, such as a van or truck, according to the present invention. While the illustrated embodiments of the present invention are particularly adapted for use with a van or truck it is noted that the present invention can be utilized with any motor vehicle having inflated tires such as automobiles, recreational vehicles, off road vehicles such as dune buggies, and the like.

The tire carrier assembly 10 includes a tire carrier 12 for carrying and supporting a spare tire thereon, a winch assembly 14 for raising and lowering the tire carrier 12 between an upper or storing position and a lower or accessing position, a housing assembly 16 for at least partially housing the winch assembly 14 and mounting the various components to the motor vehicle, and a secondary latch assembly 18 for securing or confining the tire carrier 12 in the storing position.

The tire carrier 12 includes a tire plate 20, a swivel 22, and a spring member 24. The tire plate is adapted for supporting the spare tire. It is noted that the tire plate 20 can have many different forms. The swivel 22 vertically extends through the tire plate 20 and includes shank portion 26 which extends above the tire plate 20 and a head portion 28 at an upper end of the shank portion 26 which forms a downward facing shoulder or abutment 30. The illustrated abutment 30 is substantially planar and annular-shaped. The spring member 24 biases the tire plate 20 in an upward direction to retain tension in the assembly as is known in the art. The illustrated spring member 24 is a coil compression spring acting between a flange 32 and the lower side of the tire plate 20.

The winch assembly 14 includes a shaft 34, a spool or reel 36 rotatable with the shaft 34, and a flexible member 38 such as a cable, rope or cord which is wound onto and off of the reel 36. The shaft 34 of the illustrated embodiment is substantially horizontal and extends outwardly from the housing assembly 16. The shaft 34 is mounted for rotation about its central axis 40. The reel 36 is mounted for rotation with the shaft 34 and is adapted to wind and unwind the flexible member 38 thereon upon rotation of the shaft 34. It is noted that suitable torque limiters, gear reduction devices and the like can be provided in a known manner. It is noted that any suitable winch assembly known in the art can be utilized within the scope of the present invention. The flexible member 38 has a first or upper end secured to the reel 36 and a second or lower end extending through the swivel 22 such that the tire plate 20 is raised and lowered as the flexible member 38 is wound and unwound on the reel 36 respectively.

The housing assembly 16 includes a housing 42, a cover plate 44, and a mounting bracket 46. The housing 42 is generally shaped and sized to enclose the winch assembly 14 within a hollow interior space. The housing 42 has an open side for insertion of the winch assembly 42 and an opening on a generally closed side opposite the open side for passage of the winch shaft 34 therethrough. The housing 42 also has an opening 48 at its bottom wall for passage of the flexible member 38 from the reel 36 to the swivel 22. The illustrated cover plate 44 is generally planar and is adapted to generally close the open side of the housing 42 when secured thereto. The cover plate 44 extends downwardly below the housing 42 to cooperate with the mounting bracket 46 as described in more detail herein below. The mounting bracket 46 is adapted for supporting the secondary latch assembly 18 as described in more detail herein below. The mounting bracket 46 is secured to the generally closed side of the housing 42 such that the cover plate 44 and mounting bracket 46 are on opposite sides of the housing 42. The mounting bracket 46 includes a clearance opening 50 for passage of the winch shaft 34 therethrough. The mounting bracket 46 extends downwardly below the housing 42 and is sized and shaped to cooperate with the cover plate 44 to form a vertically extending passage 52 below the housing 42 through which the flexible member 38 and the swivel 22 can vertically travel.

The lower end of the mounting bracket 46 is provided with an opening 54 and the lower end of the cover plate 44 is provided with a pair of openings 56. The openings 54, 56 cooperate to form a generally horizontal support surface 58 for the secondary latch assembly 18 as described in more detail hereinbelow. The illustrated openings 54, 56 each form a generally horizontal and planar lower surface and each of the lower surfaces are generally at the same vertical height.

Figure 5:
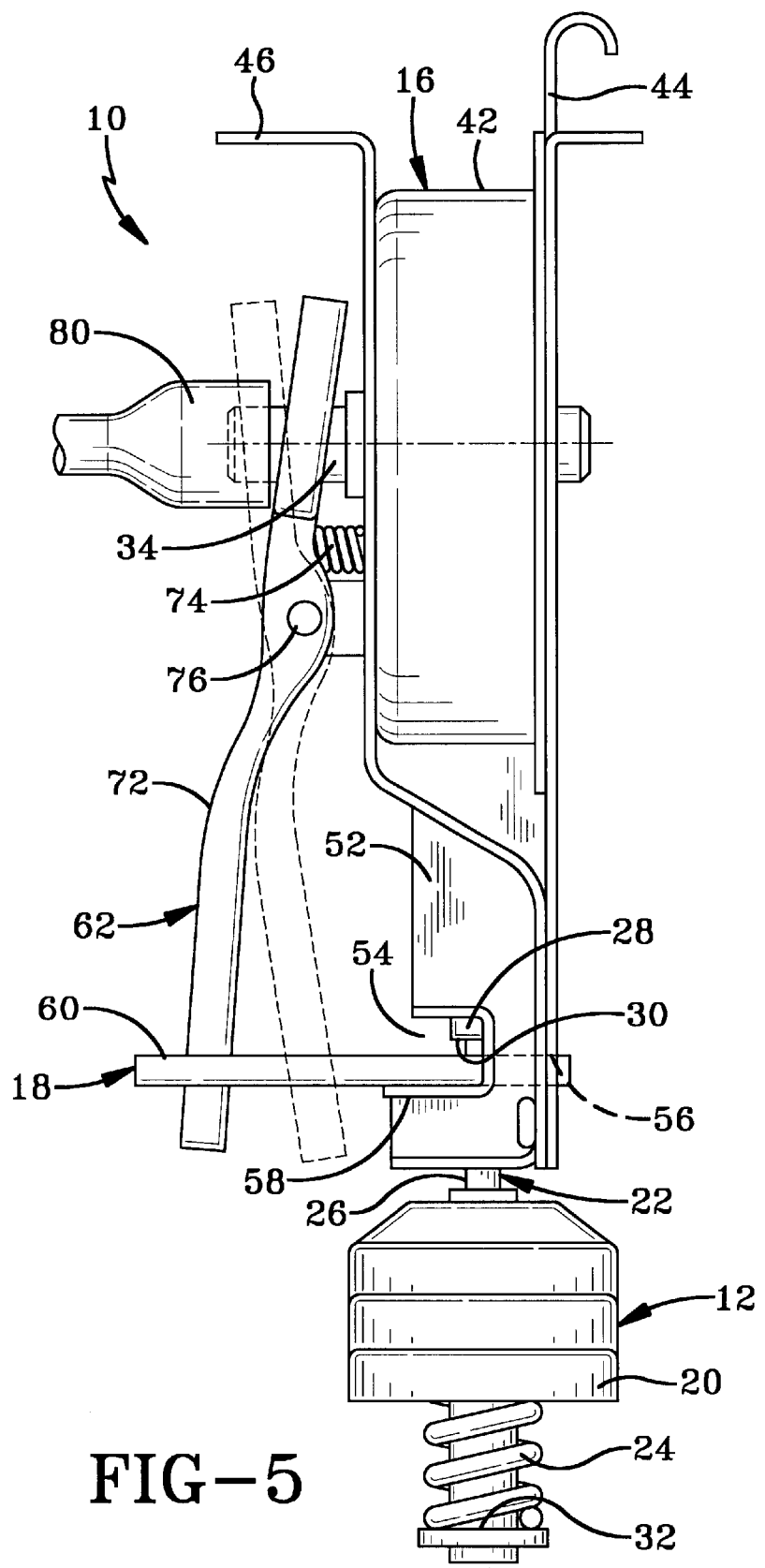
FIG. 5 is an elevational view of the tire carrier of FIGS. 1 to 3 wherein the secondary latch is in an unlocked position.

The secondary latch assembly 18 includes a slider or latch member 60 and an actuator 62 for moving the latch member 60 between a latching position wherein the tire carrier 12 is retained in the storing position (best shown in FIG. 1) and an unlatching position wherein the tire carrier 12 is free to change positions (best shown in FIG. 5). The illustrated latch member 60 is a generally planar member having a first or locking opening 64 formed therein which is sized and shaped for passage of the shank portion 26 but not the head portion 28 of the swivel 22 vertically therethrough and a second or unlocking opening 66 formed therein which is sized and shaped for passage of both the shank and head portions 26, 28 of the swivel 22 vertically therethrough. The openings 64, 66 open into each other such that the shank portion 26 of the swivel 22 can horizontally pass from one of the openings 64, 66 to the other of the openings 64, 66 as the latch member 60 is horizontally translated. The illustrated locking opening 66 opens to an end of the latch member 60 to form a pair of laterally spaced apart fingers 68 adapted to extend into the openings 56 in the lower end of the cover plate 44. The latch member 60 is also provided with a vertically extending slot 70 near the end opposite the fingers 68. The slot 70 is adapted to cooperate with the actuator 62 as described in more detail hereinbelow. The lower surface of the latch member 60 is preferably substantially planar to cooperate with the generally planar support surface formed by the housing assembly 16. The upper surface of the latch member 60 is preferably planar about the openings 64, 66 to cooperate with the generally planar abutment 30 formed by the swivel head portion 28.

The latch member 60 horizontally extends through the vertical passage 52 and is supported by the openings 54, 56 in the cover plate 44 and the mounting bracket 46 with the shank 26 and/or the flexible member 38 passing therethrough. Note that a generally planar lower surface of the latch member 60 rests on the horizontal support surface 58 formed by the openings 54, 56. Supported in this manner, the latch member 60 is free to slide on the support surface 58 along a horizontal linear path such that a desirable one of the openings 64, 66 is positioned at the swivel 22 and/or flexible member 38.

The illustrated actuator 62 includes an arm 72 pivotable between a locking position (best shown in FIG. 1) and an unlocking position (best shown in FIG. 5) and a spring member 74 for biasing the arm 72 to the locking position. The arm 72 is generally vertical and is located adjacent the mounting bracket 46 opposite the housing 42. The arm 72 generally extends from the winch shaft 34 to the latch member 60. A central portion of the arm 72 is pivotally secured to the mounting bracket such that the arm pivots about a generally horizontal and laterally extending pivot axis 76 wherein the lower and upper portions of the arm 72 move toward and away from the mounting bracket 46 as the arm 72 pivots. The upper portion of the arm 72 is provided with an opening 78 such that the arm 72 at least partially encircles the winch shaft 34 so that the upper portion of the arm 72 must be depressed, thus pivoting the arm 72, when a tool 80 is engaged with the free end of the winch shaft 34 to rotate the shaft 34 (best shown in FIG. 5). The illustrated arm 72 is adapted to fully encircle the shaft 34. The lower end of the arm is sized and shaped to extend through the slot 70 of the latch member 60. It is noted that the arm 72 slidingly extends through the slot 70 without a rigid connection such that the pivoting motion the arm 72 linearly translates the latch member 60 along the support surface 58. It should be appreciated from the above description that the latch member 60 is "free floating", that is, it is free of rigid connections such that it is free to move in at least a vertical direction and preferably in a longitudinal and/or lateral direction.

The illustrated spring member 74 is coil compression spring acting between the mounting bracket 46 and the arm 72 above the pivot axis 76. Preferably, bosses are formed on the mounting bracket 46 and the arm 72 to maintain the spring member 74 in position. Mounted in this manner, the spring member 74 biases the arm 72 to the locking position such that the latch member 60 is biased to its locking position. It is noted that any suitable spring member 74 can be utilized such as, for example, a torsion spring located near the pivot axis 76 or a tension spring below the pivot axis 76.

Figure 1:
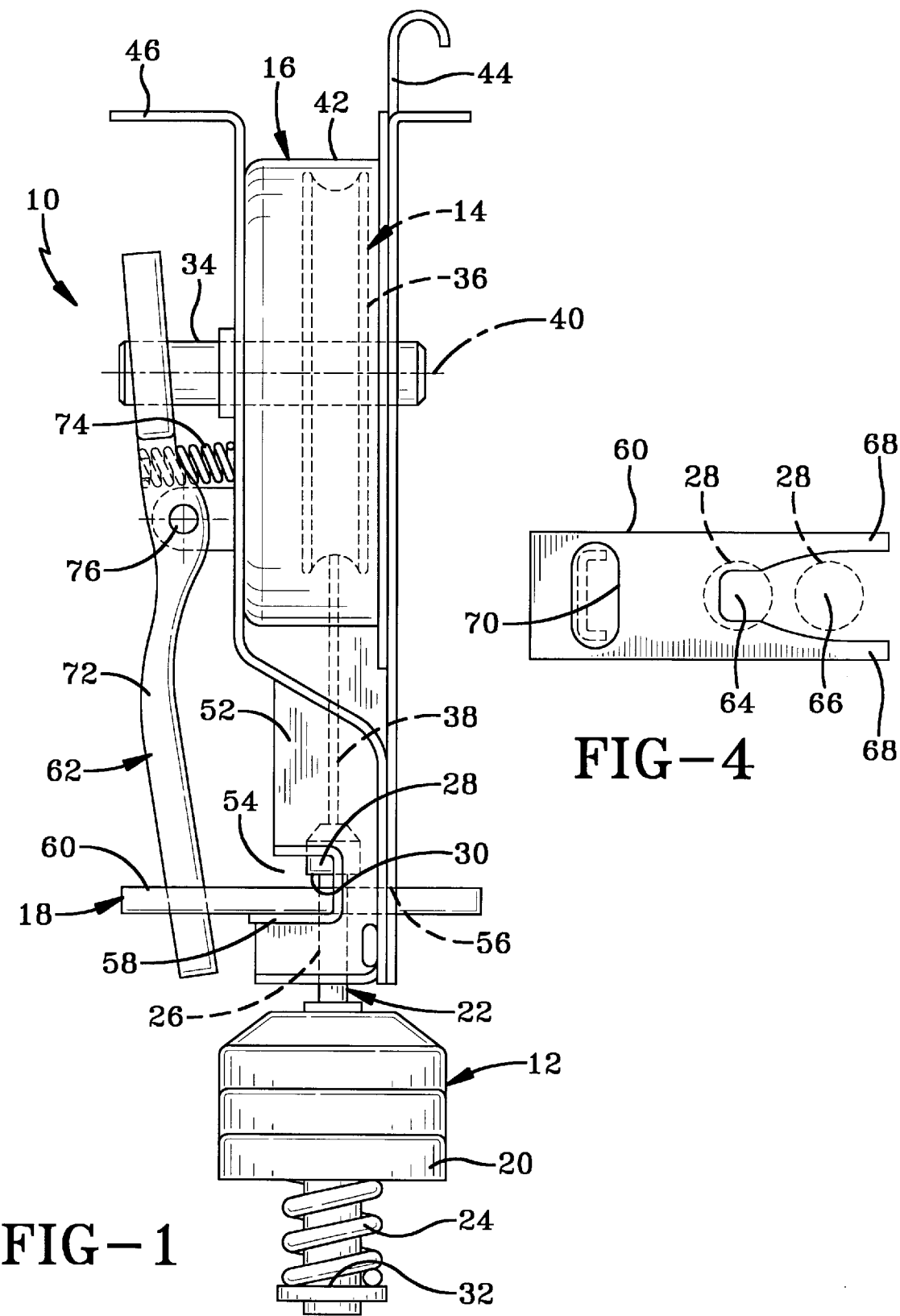
FIG. 1 is an elevation view of a tire carrier having a secondary latch according to a first embodiment of the present invention wherein the secondary latch is in a locked position.
Figure 2:
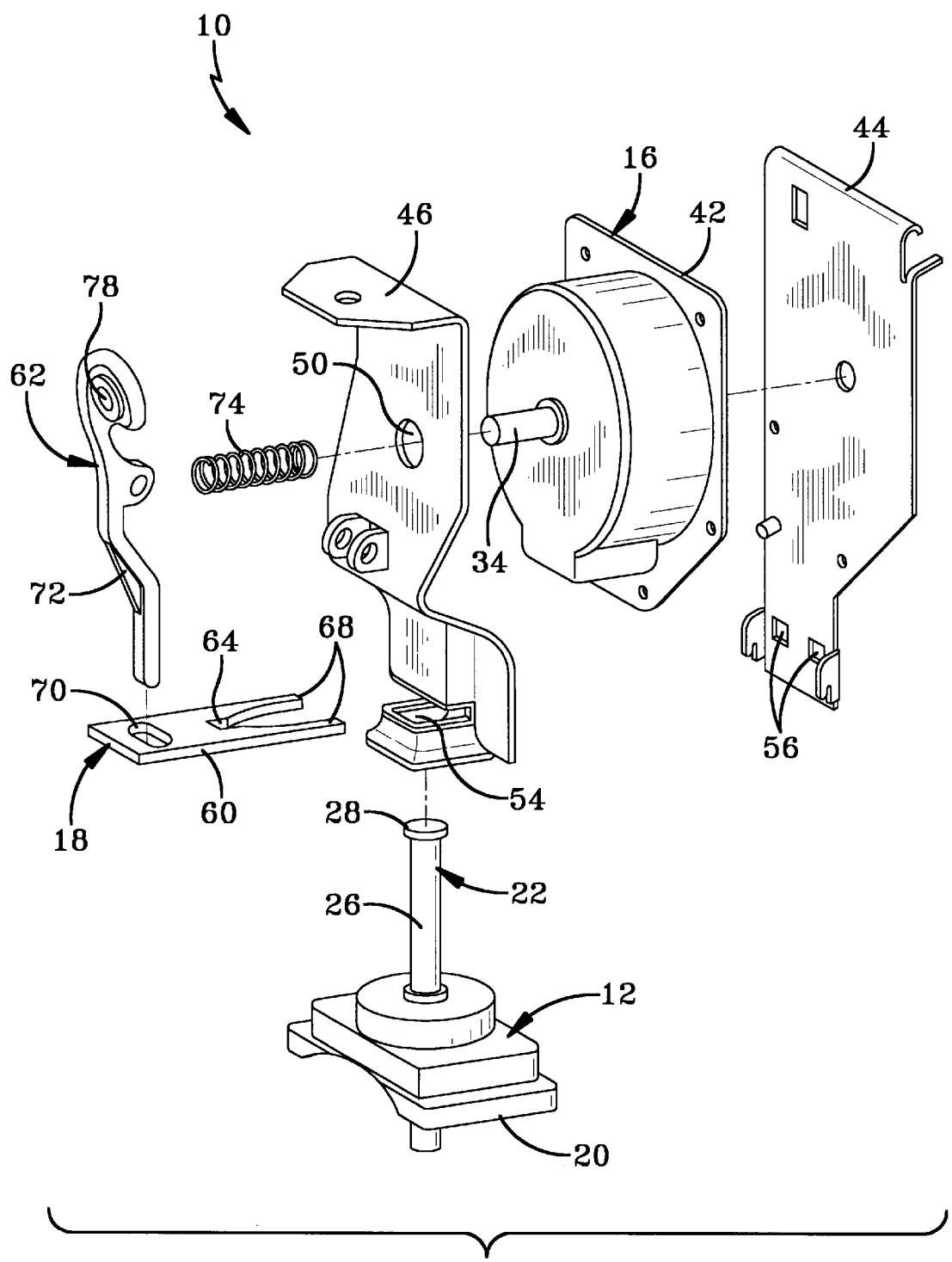
FIG. 2 is a perspective view of the tire carrier of FIG. 1.
Figure 3:
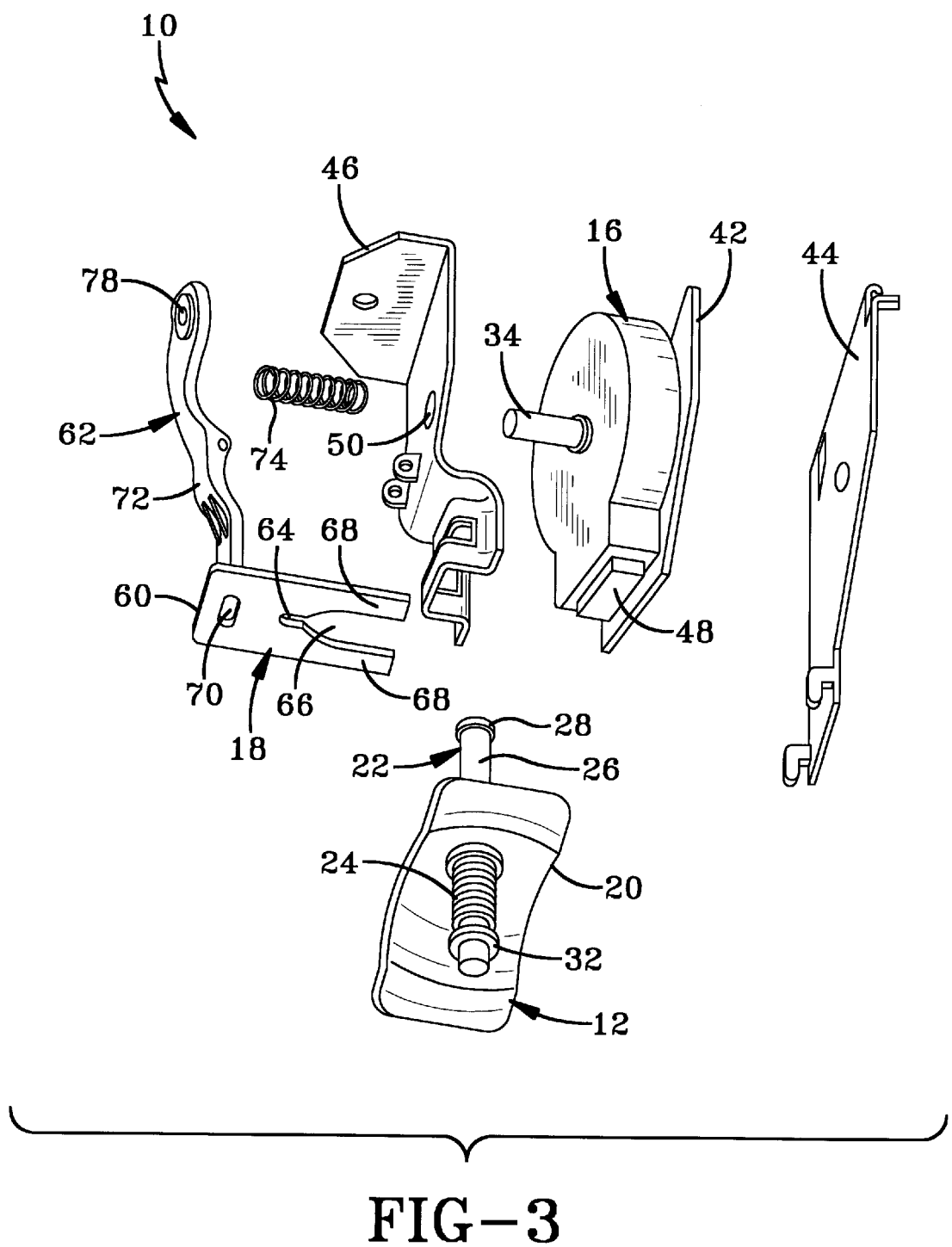
FIG. 3 is a perspective view of the tire carrier FIGS. 1 and 2.

During normal operation of the motor vehicle, the spare tire is secured in the storing position as best shown in FIG. 1. In this storing position, the head portion 28 of the swivel 22 is located in the vertical passage 52 with the shank portion 26 of the swivel 22 passing through the latch member 60. The latch member 60 is in the locking position such that the shank portion 26 of the swivel 22 is passing through the locking opening 64 of the latch member 60. The spring member 74 biases the arm 72 to the locking position such that the latch member 60 is held and maintained in its locking position. In the event of a failure of the winch assembly 14 such as a breakage of the flexible member 38, the tire carrier 12 is maintained or confined in the storing position because the head portion 28 of the swivel 22 can not pass through the locking opening 64 of the latch member 60 because the abutment 30 engages the latch member 60. The shank portion 26 is prevented from passing from the locking opening 64 to the unlocking opening 66 of the latch member 60 by the cover plate 44.

When it is desired to lower the tire carrier 12 from the storing position to the accessing position, the operator places the tool 80 onto the shaft 34 of the winch assembly 14 as best shown in FIG. 5. As the tool 80 engages the shaft 34, the tool 80 depresses the upper portion of the arm 72 to pivot the arm 72 about the pivot axis 76 from the locking position to the unlocking position. As the arm 72 pivots, the lower end of the arm 72 linearly moves the latch member 60 from the locking position to the unlocking position such that the shank 26 of the swivel 22 passes from the locking opening 64 to the unlocking opening 66. With the shank 26 passing through the unlocking opening 66, the head portion 28 of the swivel 22 is free to pass through the latch member 60 as the operator rotates the shaft 34 and unwinds the flexible member 38 from the reel 36. When the tool 80 is removed from the shaft 34, the spring member 74 returns the arm 72 and the latch member 60 to their locking positions.

Figure 6:
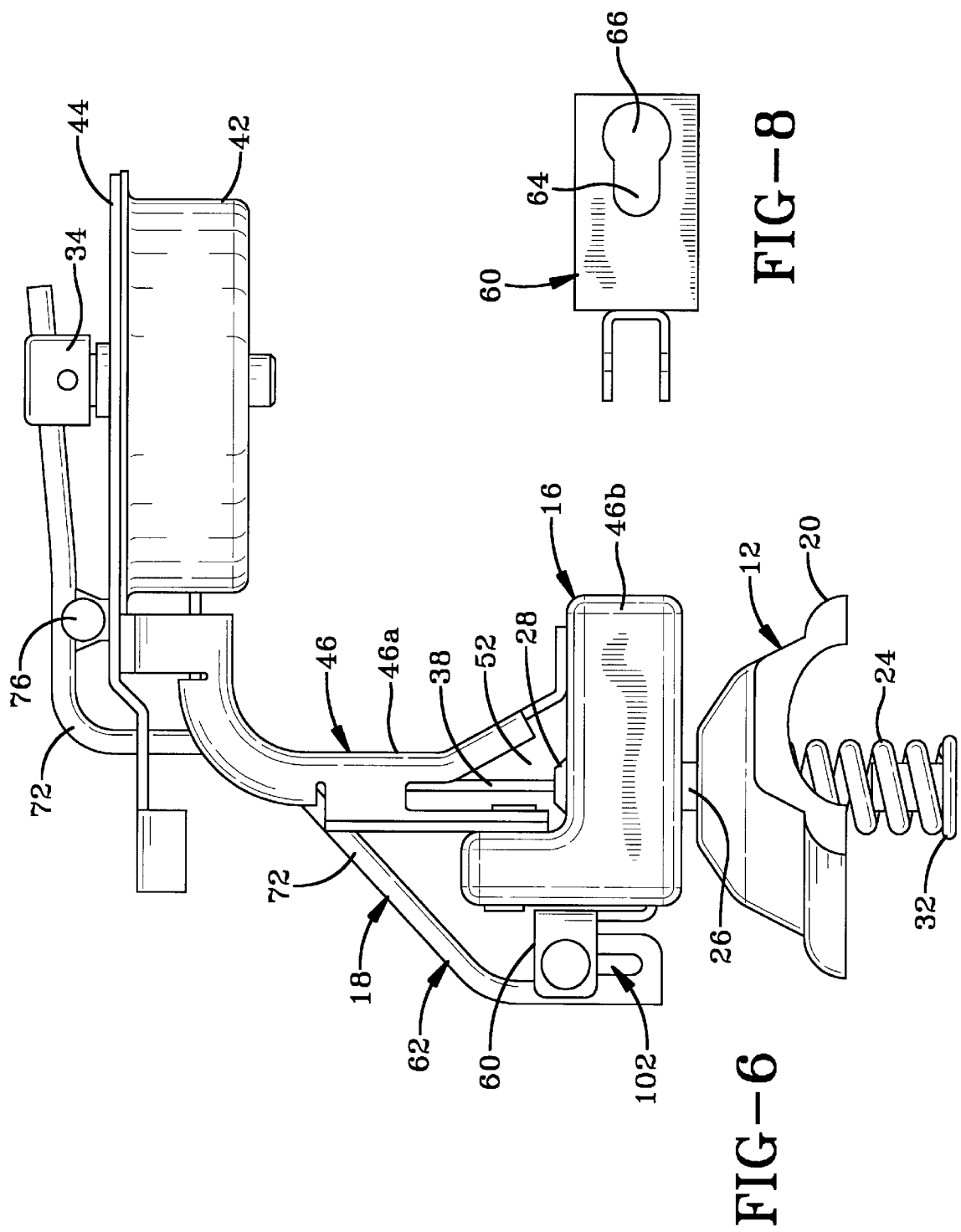
FIG. 6 is an elevation view of a tire carrier having a secondary latch according to a second embodiment of the present.
Figure 7:
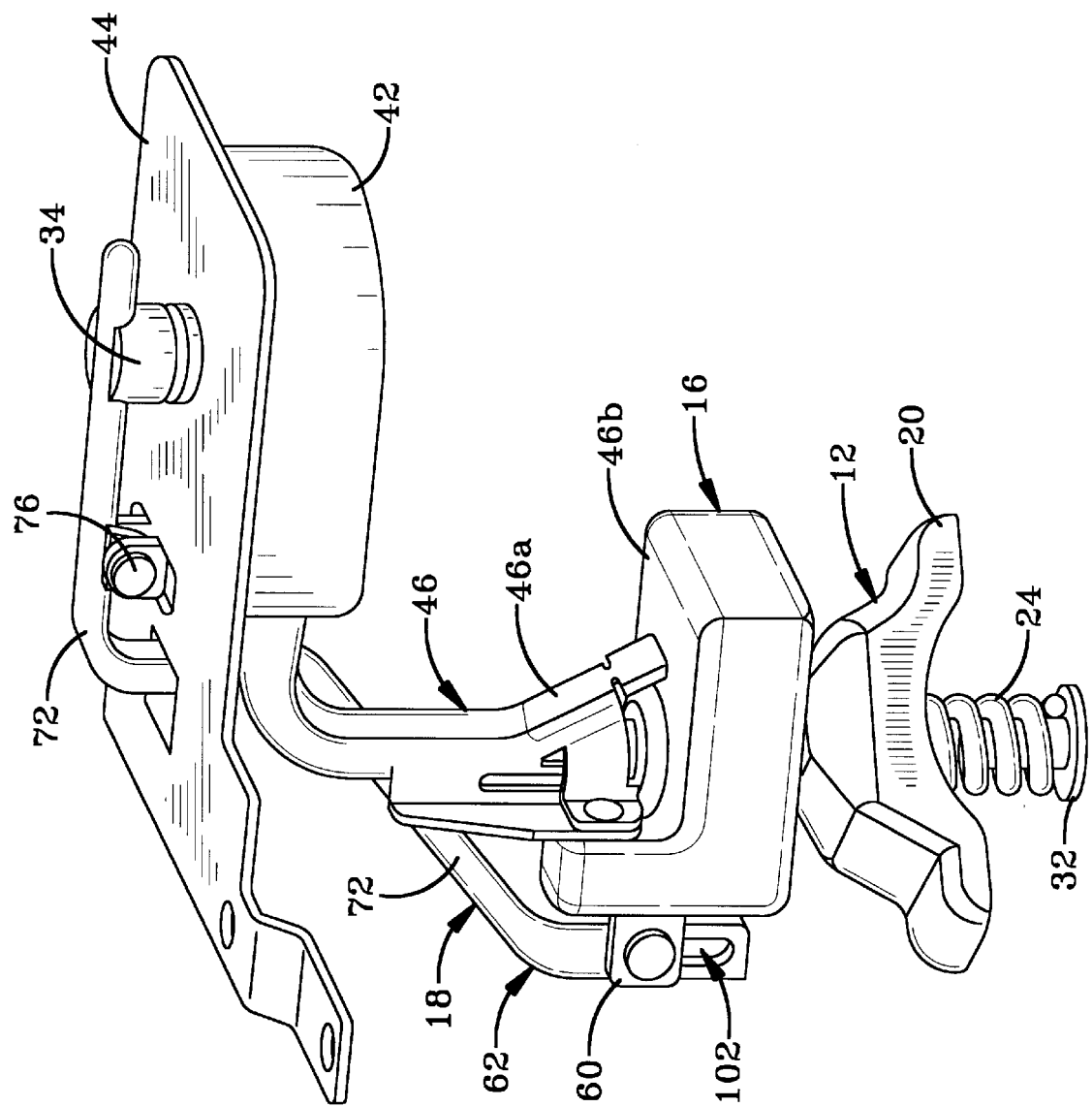
FIG. 7 is a perspective view of the tire carrier of FIG. 6.

FIGS. 6 to 8 illustrate a tire carrier assembly 100 for a spare tire of a motor vehicle, such as a van or truck, according to a second embodiment of the present invention wherein like reference numbers are used to identify like structure. The second embodiment illustrates, for example, that the winch shaft 34 can be generally vertical, that the arm 72 can have a pin-and-slot connection 102 with the latch member, and that the first and second openings 64, 66 of the latch member 60 can cooperate to form a "keyhole shape". The second embodiment further illustrates that the tire carrier 12, the housing assembly 16, and secondary latch assembly 18 can take many forms within the scope of the present invention. The mounting bracket 46 includes first and second portions 46a, 46b. The second portion is a housing which generally forms a hollow interior space for the latch member 60 to protect the latch member 60. The second portion 46b can be advantageously formed of a plastic material. The first portion 46a connects the second portion 46b to the cover plate 44 and the housing 42 and forms a guide for changing the direction of the flexible member 38.

FIGS. 9 to 12 illustrate a tire carrier assembly 200 for a spare tire of a motor vehicle, such as a van or truck, according to a third embodiment of the present invention wherein like reference numbers are used to identify like structure. The third embodiment illustrates, for example, that the latch member 60 can be in the form of a clip with flexible fingers 202. The third embodiment further illustrates that the housing assembly 16 and secondary latch assembly 18 can take many forms within the scope of the present invention.

The secondary latch assembly 18 includes a secondary latch housing 204 and a latch member 60 in the form of a resilient e-clip 206. The swivel 22 extends through an opening in the housing 204 and is locked into position by the e-clip 206 that is compression fit about the housing 204 in a manner that permits the e-clip 206 to contact the swivel 22. The e-clip 206 engages a channel defined around the housing and enters the interior of the housing from slots defined within the channels thereby locking the swivel 22 into position. The e-clip 206 can include a slot or opening on a portion of the clip 206 not contacting the swivel 22. This slot or opening can be employed for relieving stresses in the clip 206, and connection of an actuator for removing the clip 206. The upper portion of the housing 204 preferably includes hook-like projections for attachment to the mounting bracket 46. The hook-like projections can be of any suitable size, shape, and position on the housing. If desired, the hook-like projections can include openings.

It should be noted that the each of the features of the various embodiments disclosed in detail hereinabove can be utilized with each of the other disclosed embodiments.

It should be appreciated from the above noted description that the secondary latch assembly of the present invention provides improved load distribution due to the planar engagement surfaces of the latch member 60, reduced weight due to the ability to utilize a relatively large number of plastic parts, a relatively small number of total parts, improved ease of assembly due to the reduced number of parts and free floating latch member 60, a relatively low number of high tolerance parts due to the free floating latch member 60, and improved reliability due to the spring bias of the actuator 62 and increased use of corrosion resistant materials.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the latch member 60 and the actuator 62 can have many different forms. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A tire carrier assembly comprising, in combination:
   a tire carrier having a shank portion and a head portion along the shank portion;
   a winch assembly operably connected to the tire carrier to raise and lower the tire carrier between upper and lower positions;
   a housing assembly; and
   a latch assembly secured to the housing assembly and including a latch member and an actuator adapted to selectively move the latch member along a linear path between a locking position and an unlocking position, wherein the latch member is adapted to permit passage of the shank portion but not the head portion past the latch member when the latch member is in the locking position and to permit passage of both the shank portion and the head portion past the latch member when the latch member is in the unlocking position, the housing assembly forming support surfaces located on opposed sides of the shank portion in a direction of the linear path and adapted to support the latch member at the opposed sides when the latch member is in the locking position.

2. The tire carrier assembly according to claim 1, further comprising a spring member biasing the latch member to the locking position.

3. The tire carrier assembly according to claim 1, wherein the latch member has a first opening sized to prevent passage of the head portion therethrough when the latch member is in the locking position and a second opening adapted to permit passage of the head portion therethrough when the latch portion is in the unlocking position, the first and second openings of the latch member open into each other such that the shank portion can horizontally pass between the first and second openings, and the first and second openings generally form a keyhole shape.

4. The tire carrier assembly according to claim 1, wherein the support surfaces are adapted to support the latch member at the opposed sides when the latch member is in the unlocking position.

5. The tire carrier assembly according to claim 1, wherein the actuator is adapted to be movable relative to the latch member in a direction substantially perpendicular to the support surfaces.

6. The tire carrier assembly according to claim 1, wherein the support surfaces are horizontal.

7. The tire carrier assembly according to claim 2, wherein the latch member is adapted to slide along the support surfaces between the locking and unlocking positions.

8. The tire carrier assembly according to claim 1, wherein said actuator includes an arm pivotable between a locking position and an unlocking position and having one end extending through an opening formed in the latch member such that pivotal movement of the arm linearly moves the latch member, and the arm is adapted to longitudinally slide within the opening relative to the latch member during pivotable movement of the arm.

9. The tire carrier assembly according to claim 8, wherein the actuator further includes a spring member biasing the arm to the locking position.

10. The tire carrier assembly according to claim 1, wherein the actuator includes an arm pivotable between a locking position and an unlocking position and having one end operably connected to the latch member with a slot and pin connection such that pivotal movement of the arm linearly moves the latch member.

11. The tire carrier assembly according to claim 10, wherein the actuator further includes a spring member biasing the arm to the locking position.

12. The tire carrier assembly according to claim 1, wherein the latch member includes a pair of fingers adapted to prevent passage of the head portion past the latch member when the latch member is in the locking position.

13. The tire carrier assembly according to claim 12, wherein the fingers are resilient.

14. The tire carrier assembly according to claim 1, wherein the latch member has a first opening sized to prevent passage of the head portion therethrough when the latch member is in the locking position and a second opening adapted to permit passage of the head portion therethrough when the latch portion is in the unlocking position.

15. The tire carrier assembly according to claim 14, wherein the first and second openings of the latch member open into each other such that the shank portion can horizontally pass between the first and second openings.

16. The tire carrier assembly according to claim 15, wherein at least the second opening is formed by spaced apart fingers.

17. A tire carrier assembly comprising, in combination:
   a tire carrier having a shank portion and a head portion along the shank portion;

a winch assembly operably connected to the tire carrier to raise and lower the tire carrier between upper and lower positions;

a housing assembly; and a latch assembly secured to the housing assembly and including a latch member and an actuator adapted to selectively move the latch member along a linear path between a locking position and an unlocking position, wherein the latch member is adapted to permit passage of the shank portion but not the head portion past the latch member when the latch member is in the locking position and to permit passage of both the shank portion and the head portion past the latch member when the latch member is in the unlocking position, and wherein the latch member has a first opening sized to prevent passage of the head portion therethrough when the latch member is in the locking position and a second opening adapted to permit passage of the head portion therethrough when the latch member is in the unlocking position.

18. The tire carrier assembly according to claim 17, wherein the first and second openings of the latch member open into each other such that the shank portion can horizontally pass between the first and second openings.

19. The tire carrier assembly according to claim 18, wherein at least the second opening is formed by spaced apart fingers.

20. A tire carrier assembly comprising, in combination:

a tire carrier having a shank portion and a head portion along the shank portion;

a winch assembly operably connected to the tire carrier to raise and lower the tire carrier between upper and lower positions;

a housing assembly forming a support surface; and a latch assembly including a latch member supported by the support surface and an actuator adapted to selectively move the latch member between a locking position and an unlocking position, wherein the latch member and support surface are adapted to permit passage of the shank portion but not the head portion past the latch member when the latch member is in the locking position and to permit passage of both the shank portion and the head portion past the latch member when the latch member is in the unlocking position, wherein the support surface is located on opposed sides of the shank portion in a direction of movement of the latch member and adapted to support the latch member at the opposed sides when the latch member is in the locking position.

21. The tire carrier assembly according to claim 20, wherein the support surface is generally horizontal.

22. The tire carrier assembly according to claim 20, wherein the latch member is adapted to slide along the support surface between the locking and unlocking positions.

23. The tire carrier assembly according to claim 20, wherein said actuator includes an arm pivotable between a locking position and an unlocking position and having one end extending through an opening formed in the latch member such that pivotal movement of the arm linearly moves the latch member, and the arm is adapted to longitudinally slide within the opening during pivotable movement of the arm.

24. The tire carrier assembly according to claim 20, wherein the support surfaces are adapted to support the latch member at the opposed sides when the latch member is in the unlocking position.

25. The tire carrier assembly according to claim 20, wherein the actuator is adapted to be movable relative to the latch member in a direction substantially perpendicular to the support surface.

26. The tire carrier assembly according to claim 20, wherein the latch member has a first opening sized to prevent passage of the head portion therethrough when the latch member is in the locking position and a second opening adapted to permit passage of the head portion therethrough when the latch member is in the unlocking position.

27. The tire carrier assembly according to claim 26, wherein the first and second openings of the latch member open into each other such that the shank portion can horizontally pass between the first and second openings.

* * * * *

UNITED STATES PATENT AND TRADEMARK OFFICE
CERTIFICATE OF CORRECTION

PATENT NO.    : 6,267,546 B1
DATED         : July 31, 2001
INVENTOR(S)   : Oxyer et al.

Page 1 of 1

It is certified that error appears in the above-identified patent and that said Letters Patent is hereby corrected as shown below:

<u>Column 8,</u>
Line 23, delete "2" and add "6".

Signed and Sealed this

Seventh Day of May, 2002

*Attest:*

*Attesting Officer*

JAMES E. ROGAN
*Director of the United States Patent and Trademark Office*